Figure 1:
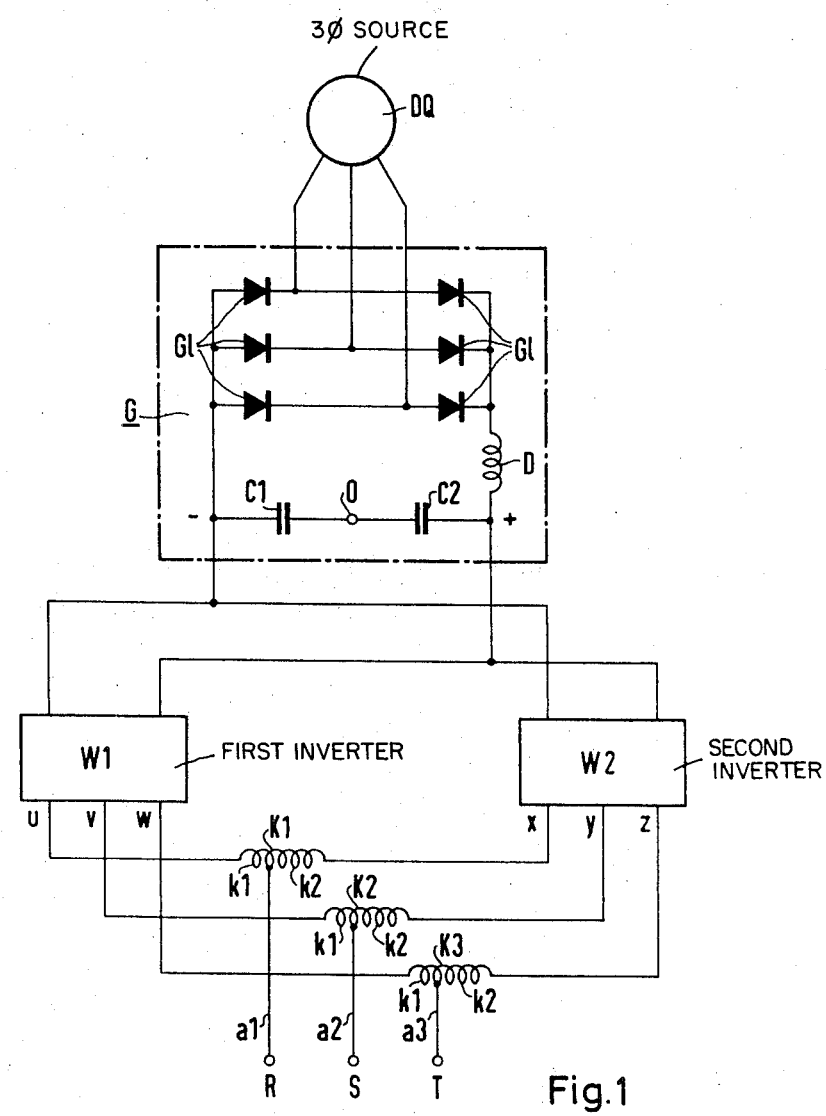

United States Patent [19]
Sauer

[11] 3,781,635
[45] Dec. 25, 1973

[54] CIRCUIT FOR CONVERTING DC VOLTAGE INTO THREE-PHASE VOLTAGE

[75] Inventor: Helmut Sauer, Nurnberg, Germany

[73] Assignee: Siemens Aktiengesellschaft, Berlin, Germany

[22] Filed: Jan. 18, 1972

[21] Appl. No.: 218,792

[30] Foreign Application Priority Data
Jan. 25, 1971 Germany................. P 21 03 230.4

[52] U.S. Cl............... 321/9 R, 321/26, 321/27 R, 321/DIG. 1
[51] Int. Cl....................... H02m 1/12, H02m 7/00
[58] Field of Search ............... 321/4, 5, 9 A, 26, 321/27 R, DIG. 1

[56] References Cited
UNITED STATES PATENTS
3,568,021   3/1971   Turnbull........................... 321/4 X
3,657,633   4/1972   Urish .............................. 321/DIG. 1
3,638,094   1/1972   VeNard ......................... 321/DIG. 1
3,573,602   4/1971   Jensen.............................. 321/27 R
3,628,123   12/1971  Rosa et al. ........................... 321/9 R Primary Examiner—Gerald Goldberg
Attorney—Arthur E. Wilfond et al.

[57] ABSTRACT

A circuit for converting DC voltage or a three-phase voltage of variable or constant frequency into a three-phase voltage of a constant other frequency utilizes an intermediate circuit frequency converter. The converter comprises two three-phase thyristor inverters, connected in parallel at the input side. The three-phase outputs of the one three-phase thyristor inverters are connected together via voltage divider chokes. The taps of the voltage divider chokes provide the three outputs of the converter.

1 Claim, 8 Drawing Figures

CIRCUIT FOR CONVERTING DC VOLTAGE INTO THREE-PHASE VOLTAGE

The present invention relates to a converter. More particularly, the invention relates to a circuit for converting a DC voltage or a three-phase voltage of variable or constant frequency into a three-phase voltage of a constant other frequency.

It is customary in the production of a twelve pulse voltage to add the voltages of two six pulse converters by means of two three-phase transformers. The volume and weight of such converters is considerable.

If the objective is to produce from a three-phase voltage with variable frequency, a three-phase voltage with constant frequency and, if possible, a sinusoidal voltage curve, a space and weight-saving structure is frequently required for the converters.

The invention emanates from a known intermediate circuit converter comprising a rectifier and two inverters which are connected in parallel on the input side. Calculations during tests conducted with such intermediate circuit converters have shown that the addition of the voltage of the two parallel-connected inverters on the input side by utilizing two three-phase transformers whose space requirement and weight are relatively large, can be omitted and that the three-phase transformers may be replaced by chokes which weigh less, provided certain requirements are satisfied.

The principal object of the invention is to provide a converter of the aforedescribed type which overcomes the disadvantages of similar known types of converters.

An object of the invention is to provide a converter of the aforedescribed type which is of light weight and occupies little space.

Another object of the invention is to provide a converter of the aforedescribed type which is efficient, effective and reliable in operation.

In accordance with the invention, a circuit for converting a DC voltage or a three-phase voltage of variable or constant frequency into a three-phase voltage of a constant other frequency utilizes an intermediate circuit converter. The converter comprises a rectifier and two three-phase thyristor inverters connected in parallel on the input side. Each of the phase outputs of one inverter is connected via a voltage divider choke to the corresponding phase outputs of the other inverter. The taps of the chokes provide the outputs of the converter.

The winding ratio of each of the tapped choke windings should be $1 : 1/1 + \sqrt{3}$ and the inverters should be controlled so that during a rectangular half wave of a phase of one inverter, the corresponding half wave of the phase of the other inverter is switched over to the other voltage direction at the onset and prior to the termination of the half period for about one-sixth of the time period.

The control of both inverters and the voltage division at the choke windings produces a voltage between the taps of the choke windings having a first occurring upper harmonic which is the 11th upper harmonic, in accordance with a twelve pulse circuit.

In order that the invention may be readily carried into effect, it will now be described with reference to the accompanying drawings, wherein:

FIG. 1 is a circuit diagram of an embodiment of the converter of the invention; and FIGS. 2a to 2g are graphical presentations of a plurality of voltages occurring in the converter of FIG. 1.

FIG. 1 illustrates a three-phase source DQ. A rectifier device G is connected to the three-phase source DQ. The rectifier G comprises a plurality of rectifiers Gl and smoothing capacitors C1 and C2. A DC voltage is thus available at the outputs of the rectifier device G. The DC voltage may be used as a supply voltage for the inverters W1 and W2. The illustrated converter circuit may thus function as a DC-AC converter or as a DC three-phase current converter.

The inverter W1 has three-phase output terminals $u$, $v$ and $w$ and the inverter W2 has three-phase output terminals $x$, $y$, and $z$. The phase output u of the inverter W1 is connected to the phase output $x$ of the inverter W2 via a choke K1. The phase outputs $v$ and $w$ of the inverter W1 are connected to the phase outputs $y$ and $z$ of the inverter W2 via chokes K2 and K3, respectively.

The chokes K1, K2 and K3 have taps $a1$, $a2$ and $a3$ connected to outputs R, S and T of the converters. The desired constant output frequency may be derived from the outputs R, S and T. Each of the chokes K1, K2 and K3 has a winding ratio $k1:k2$ selected with respect to its tap in a manner whereby it satisfies the relation $$k1/k2 = 1/1 + \sqrt{3}$$

The inverters W1 and W2 are variably controlled in such a manner that during a rectangular half wave of one phase of one inverter, the corresponding half wave of the phase of the other inverter is switched over to the other voltage direction at the onset and prior to the end of the half period duration, for one-sixth of the time period. This is illustrated in FIGS. 2a to 2g wherein the desired voltages are shown.

In FIGS. 2a to 2g the illustrated rectangular voltages are explained by the accompanying legend wherein, for example $U_{uo}$ indicates that the voltage at the terminal $u$ of the inverter W1 is opposite the reference potential 0; 0 defining the connection point between the two capacitors C1 and C2 (FIG. 1) of equal capacitance.

Figure 2A:
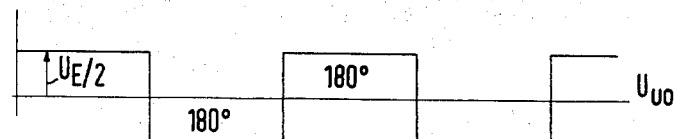
Figure 2B:
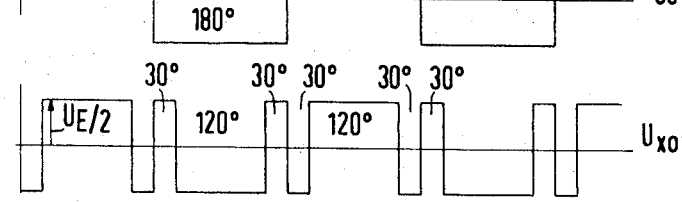

The voltage curves of FIGS. 2a and 2b indicate that during the negative half wave of the phase u of the inverter W1, phase $x$ of inverter W2 is first a positive voltage value for 30°, equal to one-sixth the half period duration, thereafter for 120°, a negative voltage value equal to four-sixths the half period duration and, finally, prior to the expiration of the negative half wave of phase $u$, a positive voltage value for 30°, equal to one-sixth the duration of a half period again occurs at the terminal $x$. During a positive half period of the rectangular voltage at the terminal $u$, corresponding voltage curves occur at the terminal $x$, while opposite voltage pulses of one-sixth the half period duration occur at the beginning and prior to the end of the half period.

Figure 2C:
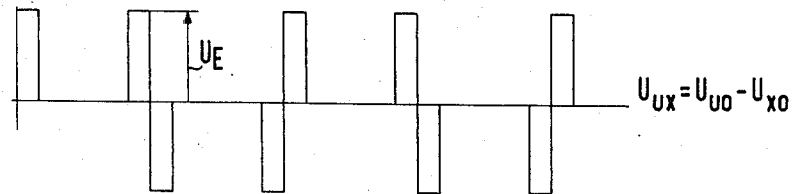
Figure 2D:
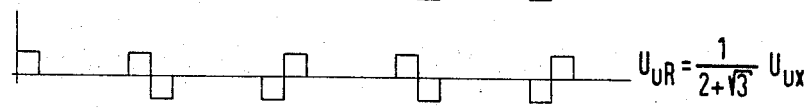
Figure 2E:
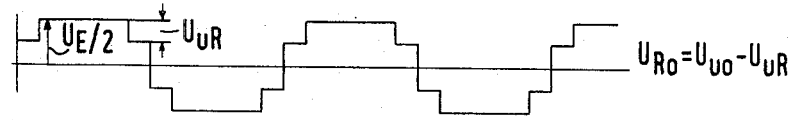
Figure 2F:
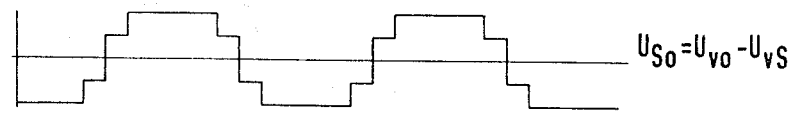

FIG. 2c illustrates the voltages occurring, for example, at the choke K1 (FIG. 1) and FIG. 2d shows the voltage at the component winding $k1$ of the choke K1. FIGS. 2e and 2f show the voltage curve between the outputs R and S toward the point 0 (FIG. 1). By subtracting the voltage $U_{So}$ (FIG. 2f) from the voltage $U_{Ro}$ (FIG. 2e), the phase to phase voltage $U_{RS}$ is obtained.

Figure 2G:
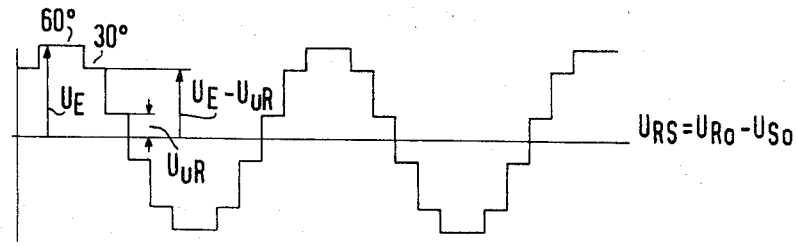

The voltage $U_{RS}$, which is the output voltage between the terminals R and S (FIG. 1) has the curve shown in FIG. 2g. Thus, a curve for voltage $U_{RS}$ is provided where the first-occurring upper harmonic is the 11th upper harmonic having an effective value of one-eleventh of the fundamental.

While the invention has been described by means of a specific example and in a specific embodiment, it should not be limited thereto, for obvious modifications will occur to those skilled in the art without departing from the spirit and scope of the invention.

I claim:

1. A circuit for converting a DC voltage into a three-phase voltage, said circuit comprising a first three-phase inverter and a second three-phase inverter connected in parallel at their DC voltage inputs; three chokes each comprising of a winding having a tap forming a ratio in the winding and the ratio of each of the tapped choke windings being $$1/(1 + \sqrt{3});$$

each of the inverters having three phase outputs, each of the phase outputs of the first inverter being electrically connected to a corresponding one of the phase outputs of the second inverter via one of the chokes; the first and second inverters being controlled in a manner to provide rectangular output voltages of equal fundamental frequency and of different curve shape, the output voltage of the first inverter being formed of positive and negative half waves and the output voltage of the second inverter being such that during a rectangular half wave of one phase of the first inverter the corresponding half wave of the corresponding phase of the second inverter at the beginning and prior to the end of the half period duration is switched to the other voltage direction for one-sixth of said time period; and three outputs of the circuit, each connected to the tap of a corresponding one of the chokes.

* * * * *